(No Model.)
F. H. RICHARDS.
WEIGHING MACHINE.
No. 585,975. Patented July 6, 1897.
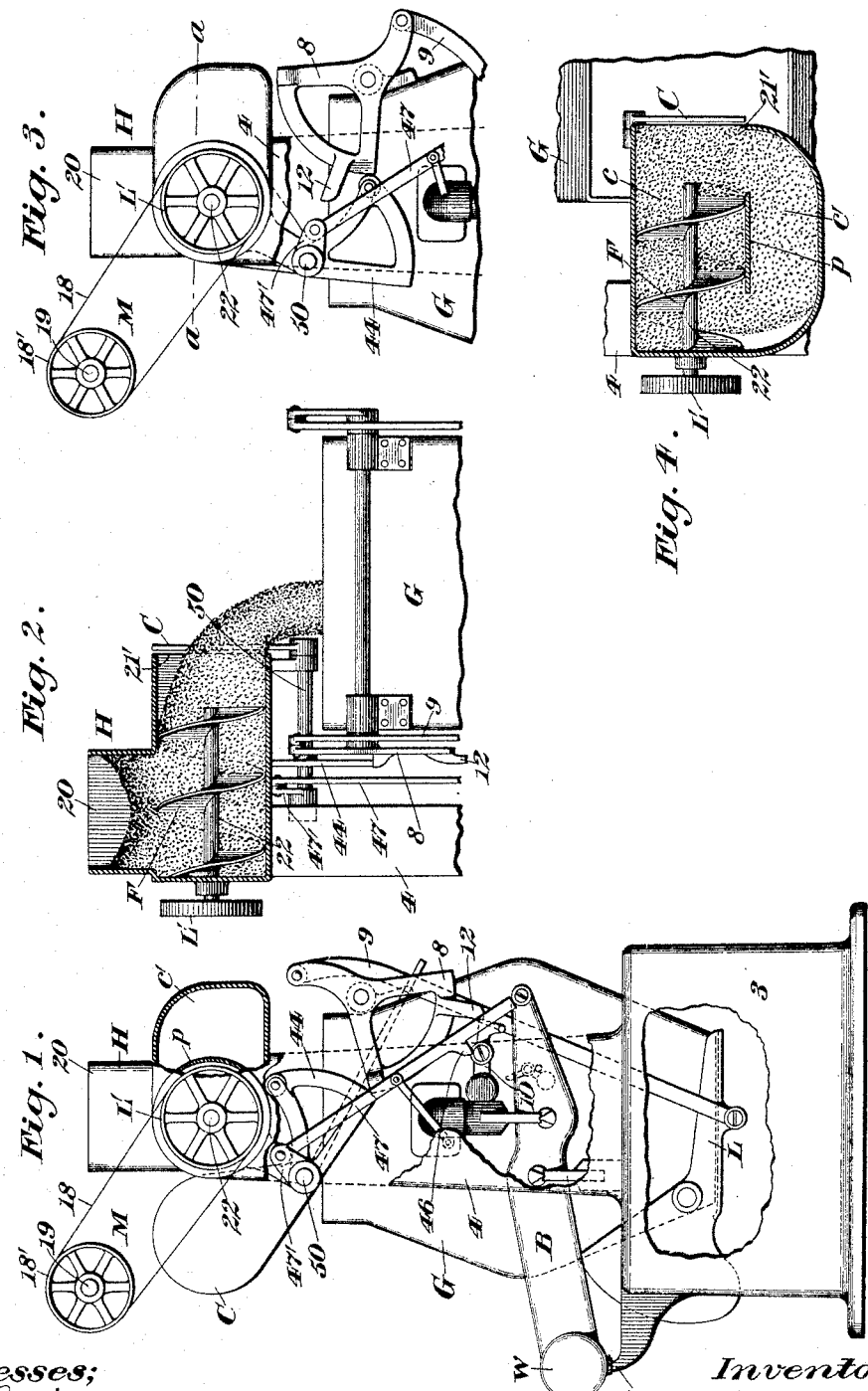
Witnesses:
O. W. Smith
Fred. J. Dole.
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,975, dated July 6, 1897.

Application filed October 5, 1896. Serial No. 607,863. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and the object of the invention is to furnish an improved machine of this character more especially adapted for automatically weighing and delivering materials of a freely-running nature, and which machine embodies improved feed mechanism, including a casing having two parallel compartments that communicate with each other at opposite ends, a force-feeder supported in one of said compartments, means for driving said force-feeder continuously during the operation of the machine, whereby a uniform supply of material may be force-fed to the load-receiver, and a valve or stream-controller operated by the movements of the load-receiver independent of the continuous movement of the force-feeder and having a progressive feed-reducing movement concurrently with the descent or overpoise movement of the load-receiver, whereby the volume of the supply-stream may be regulated with precision during the weighing operation, thus insuring the delivery of accurate bucket loads or charges and whereby the material will when the controller is in the closed position be caused to travel in a circuit.

In the drawings accompanying and forming part of this specification, Figure 1 is an end elevation, partially in section, of a weighing-machine embodying my present improvements, said figure showing the machine furnished with a two-compartment feed-case having a vertical discharge-spout and a horizontally-disposed discharge-opening and a valve or feed-controller supported in position to cut off the supply through the discharge-opening, said controller being shown in its open position and the parts of the weighing mechanism being shown in the positions they occupy when material is being supplied to the load-receiver. Fig. 2 is a rear elevation of the upper portion of the machine, partially in section, as seen from the right hand in Fig. 1. Fig. 3 is an end elevation similar to Fig. 1 of a portion of the upper end of the machine, showing the parts in the positions they occupy when the feed-controller has closed the discharge-opening of the feed-case; and Fig. 4 is a horizontal section taken on a line corresponding with the dotted line *a a*, Fig. 3, and showing but a portion of the parts, as seen from above in said Fig. 3.

Similar characters designate like parts in all the figures of the drawings.

The weighing mechanism, *per se*, together with the framework for supporting said weighing mechanism, may be of any suitable construction and organization, the same being shown in Fig. 1 similar in a general way to the weighing mechanism of the machine described in my prior patent, No. 570,304, dated October 27, 1896, to which reference may be had, and for convenience those parts in my present machine which correspond to similar parts in the machine described in said application will be designated by similar characters, respectively.

The framework for supporting the operative parts of the machine comprises in the preferred form thereof (shown most clearly in Fig. 1) a suitable supporting-base 3 and an upright or column 4, carrying at the upper end thereof the supply apparatus, which is designated in a general way by H.

The load-receiver or bucket, which is designated by G, is of the so-called "single-chambered" type, having the usual supply and discharge openings, the latter of which is controlled by a closer L, of any suitable construction, said closer being shown in the form of a pivotally-supported plate adapted to bear tightly against the lower edge of the bucket when in the normal position, (shown in Fig. 1,) the closer being shown pivotally supported adjacent to and at one side of the discharge-opening of the bucket and said closer being counterweighted, as is customary, to facilitate the return movement thereof to its normal position after the discharge of a load.

The bucket G is shown supporting, for oscillatory movement, the rocker 8, which is located near the upper forward side thereof, said rocker having pivoted thereto a closer-connecting rod 9, which is pivoted at the lower end to the closer L.

The rocker 8 and closer-connecting rod 9 constitute a toggle, and the several pivots thereof will be so located as to come substantially into alinement, as shown in Fig. 1, when the closer is shut, so that the rocker and closer will be held against accidental movement during the weighing of a load.

For locking the closer against opening movement due to the weight of the material contained in the bucket the bucket G is shown furnished with a pivotally-supported counterweighted latch 10, which normally engages the rocker-arm 12 in the usual manner, as illustrated in Fig. 1.

For supporting the bucket I may employ a scale-beam B, which is fulcrumed on the supporting-base 3 and which will usually consist of two arms, (one only being shown in the drawings,) located one at each side the bucket and joined together by a counterweight W, which latter, when the bucket is in its normal elevated position, rests upon a supporting-bracket 3' on the base 3. The arms of the beam B will be provided with suitable knife-edge pivots, on which rest depending bearings connected to brackets on the bucket in the well-known manner.

Inasmuch as the several parts of the weighing mechanism, *per se*, as superficially described in the preceding paragraphs and designated by characters may be substantially the same in construction and organization as the parts designated by the same characters in the patent hereinbefore referred to and in several other prior patents granted to me, a more detailed description of the construction and organization of these parts is deemed unnecessary in this application, and more particularly as these features may be variously modified without departure from my present invention.

The feed mechanism, in which the essence of my present invention resides, comprises in the preferred form thereof shown in the drawings a suitable supply hopper or chute, (designated in a general way by H,) having a two-compartment feed-case at the discharge end thereof and in communication therewith, which feed-case has a discharge-opening in proper relation with the inlet of the load-receiver, a rotative feeder F, operating in one compartment of the feed-case, power-driven mechanism (designated in a general way by M) in operative connection with the feeder and effective for rotating the same continuously during the operation of weighing, a valve or feed-controller C, supported in operative relation with the discharge end of the feed-case and so connected with the beam mechanism as to have a progressive stream-reducing movement concurrently with a progressive descending movement of the load-receiver.

In the drawings I have shown the feed-case divided in the direction of the length thereof by a vertically-disposed parti-circular partition $p$ into two horizontally-parallel compartments $c$ and $c'$, one of which, as $c$, constitutes a working chamber for the feeder F, which is shown as a spiral conveyer or feed-screw, and the other of which, as $c'$, constitutes a return chamber or conduit for conveying material as it leaves the discharge end of the feed-screw backward in an independent stream to the receiving end of said screw, the material moving in a circuit when the feed-controller C is in position to close the discharge-opening of said feed-case, which discharge-opening is designated by 21' and is shown in alinement with said feed-screw.

As a means for continuously rotating the feeder the feed-shaft 22 is shown furnished at the outer end thereof with a pulley L', which is constantly rotated during the weighing operation through the medium of a belt 18, which may extend from the driven pulley over a driving-pulley 18' on a driving-shaft 19, or said pulley L' may be driven directly through any suitable motor (not shown) or in any preferred manner.

As a means for controlling the operation of the feeder F and for gradually decreasing the volume of the discharged stream during and concurrently with the gradual descending movement of the bucket the valve or feed-controller, which, in the form thereof shown in the drawings, is in the nature of a cut-off plate, is pivotally supported in position for closing the discharge-opening of the feed-case, said plate or valve being preferably supported for oscillatory movement on a rock-shaft 50, shown journaled at the inner end thereof in a bearing formed in the upright 4 and at the outer end in a bracket depending from the feed-case.

As a simple and convenient means for actuating the feed-controller C when the load-receiver approaches its normal load-receiving position and to impart a gradual stream-reducing movement to said controller concurrently with the descent of said bucket I have provided an actuating-connector between the beam mechanism which supports the bucket and said stream-controller C. This actuating-connector in the form shown is in the nature of a rod 47, which is pivotally secured at its upper end to a crank 47' on the rock-shaft 50, on which the stream-controller is mounted and rests at its lower end on the poising end of the scale-beam B. Thus it will be seen that the feed-controller will have opening and closing movements concurrently with the rise and fall, respectively, of the bucket.

In practice the feed-controller and bucket-closer will be reciprocally locked in their closed positions by coacting stop members 8 and 44, respectively, which are shown in the drawings similar in a general way to like stop members described in Letters Patent of the United States No. 548,840, heretofore granted to me.

The connecting-rod 47 is shown furnished with a projection 46 for engaging and releasing the closer-latch 10 upon the descending movement of the bucket to thereby release the rocker 8 and facilitate an opening movement of the closer L.

The constructions of the feeder and feed-case are such that when the bucket is in its normal load-receiving position and the feed-controller is in the position shown in Fig. 1 the material which has passed through the hopper of the chute 20 into the feed-case will be continuously advanced or force-fed through the discharge-opening 21' into the bucket, the stream being of uniform volume and constant until the bucket is sufficiently filled to cause the same to descend, during which descending movement of the bucket the actuating-connector 47 and the beam mechanism gradually impart a feed-reducing movement to the feed-controller C, thus gradually closing the discharge-opening 21' and reducing the volume of material. As said discharge-opening 21' is decreased in effective area by the closing of the valve such material in the feed-case as is not forced through said opening will be agitated by the feeder F and carried in a continuous circuit from the receiving end of the compartment $c$ to the discharge end thereof, and thence backward through the compartment or conduit $c'$ to the receiving end of the first-mentioned compartment $c$ until the feed-controller is again shifted to its open position. The feeder, as before stated, has a continuous rotative movement during the operation of the machine. This peculiar operation of the feeder maintains, while the bucket is in its load-discharge position, a constant agitation and circulation of the material contained within the feed-case, thus positively preventing the adherence or packing of said material within the case, and also facilitates the instant discharge of the material, owing to its maintenance under pressure, to the bucket upon the opening movement of the feed-controller. This is especially advantageous, for the reason that the constant agitation of material prior to its discharge to the bucket prevents clogging and maintains the particles in such a disseminated state as to cause the mass to flow freely through the discharge-opening 21' of the feed-case immediately upon an opening movement of the feed-controller and enables the bucket to be quickly filled.

The form of feed-case hereinbefore described is very advantageous, in that it facilitates a circuitous movement of the material in a plane coinciding with the plane of the feeder when the feed-controller is in its closed position. The material is first carried from the receiving end to the discharge end of the chamber $c$ by means of the screw or feeder which rotates in said chamber, and thence to the return chamber or conduit $c'$, whence it is conducted backward to the receiving end of said screw-chamber $c$, the two oppositely-moving portions of the stream being practically independent, they being separated from each other by the partition which divides the working chamber $c$ from the return chamber or conduit $c'$.

Having described my invention, I claim—

1. In a weighing-machine, in combination, a supply apparatus comprising a casing having two independent parallel compartments that communicate with each other at opposite ends; a feeder supported in one of said compartments; means for continuously driving said feeder during the operation of the machine; and a valve for controlling the discharge of the material from the casing, the construction thereof being such that when the valve is closed or partially closed the feeder will cause the material to travel in a circuit through both compartments of the casing.

2. The combination, with weighing mechanism embodying a load-receiver, of a supply apparatus comprising a casing having inlet and discharge openings and also having a transversely-disposed screw-receiving compartment and a conduit in communication with opposite ends of said compartment; a continuously-driven screw-feeder mounted within the said compartment; means for continuously rotating said feeder during the operation of the machine; and a valve for controlling the discharge of material from the casing, whereby material will, when said valve is closed or partially closed, be caused to travel from the receiving end of the screw-compartment to the discharge end thereof and thence backward through the conduit to the receiving end of said compartment.

3. The combination, with weighing mechanism embodying a reciprocatory bucket, of a supply apparatus located above said bucket and comprising a casing having inlet and outlet openings and also having at the lower portion thereof two horizontally-parallel compartments separated from each other by a vertical partition and each communicating with the other at opposite ends thereof; a feeder mounted in one of said compartments; means for continuously driving said feeder while the machine is in operation; an oscillatory valve for governing the exit of material from the discharge-opening; and a valve-actuator effective on the descending movement of the bucket for imparting a progressive-feed-reducing movement to the valve, and whereby when said valve is closed the feeder will cause the material to have a circuitous movement through the two compartments.

4. The combination, with weighing mechanism embodying a load-receiver, of a supply apparatus supported above said receiver and comprising a casing having inlet and outlet openings and also having a feeder-supporting compartment and an independent conduit communicating with opposite ends of said feeder-compartment; a feeder supported in said compartment; means for actuating said feeder; and a valve for closing the discharge-opening, whereby when said valve is closed or partially closed material will be forced from the receiving end to the discharging end of the feeder-compartment and thence through the conduit to the receiving end of said feeder-compartment.

5. The combination, with weighing mechanism including a bucket, of feed mechanism comprehending a feed-casing having an inlet and a discharge opening and also having a series of compartments one of which is adapted for receiving a feeder; a feeder supported for rotative movement in one of said compartments; means for continuously rotating the feeder during the weighing operation; a valve pivotally supported for oscillatory movement with relation to the discharge-opening of the feed-casing; and a valve-actuator adapted on the descending movement of the bucket for imparting to said valve a closing movement of differential velocities.

FRANCIS H. RICHARDS.

Witnesses:
    FRED. J. DOLE,
    HENRY BISSELL.